May 14, 1946.  L. S. HOBBS  2,400,306
VARIABLE BLOWER DRIVE
Filed June 26, 1943  3 Sheets-Sheet 2
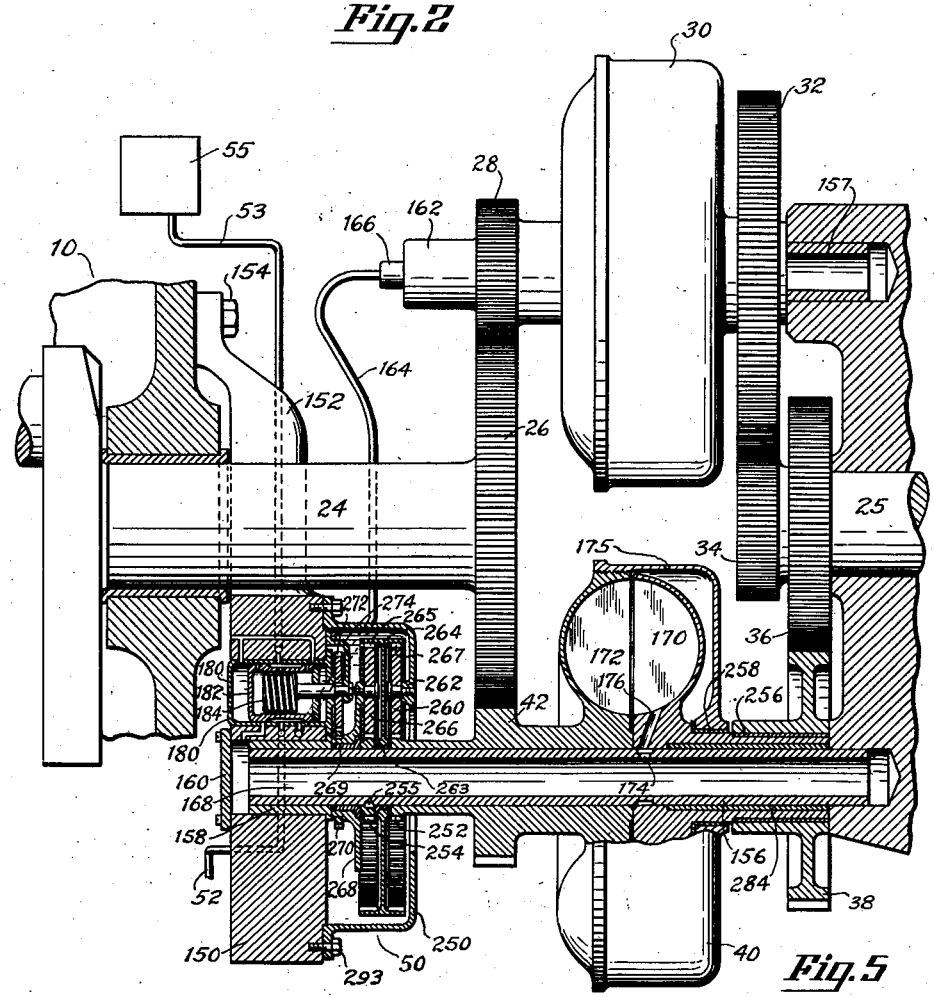
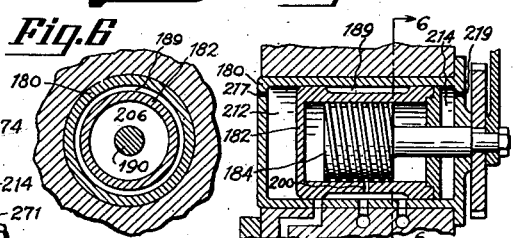
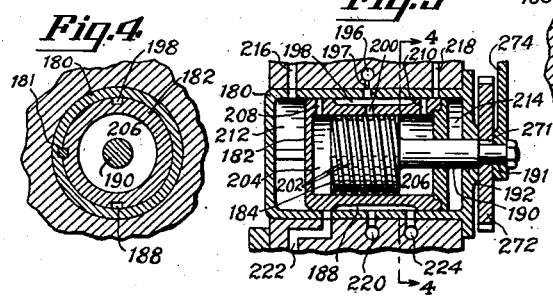
INVENTOR
*Leonard S. Hobbs*
BY
*Charles L. Shelton*
ATTORNEY.

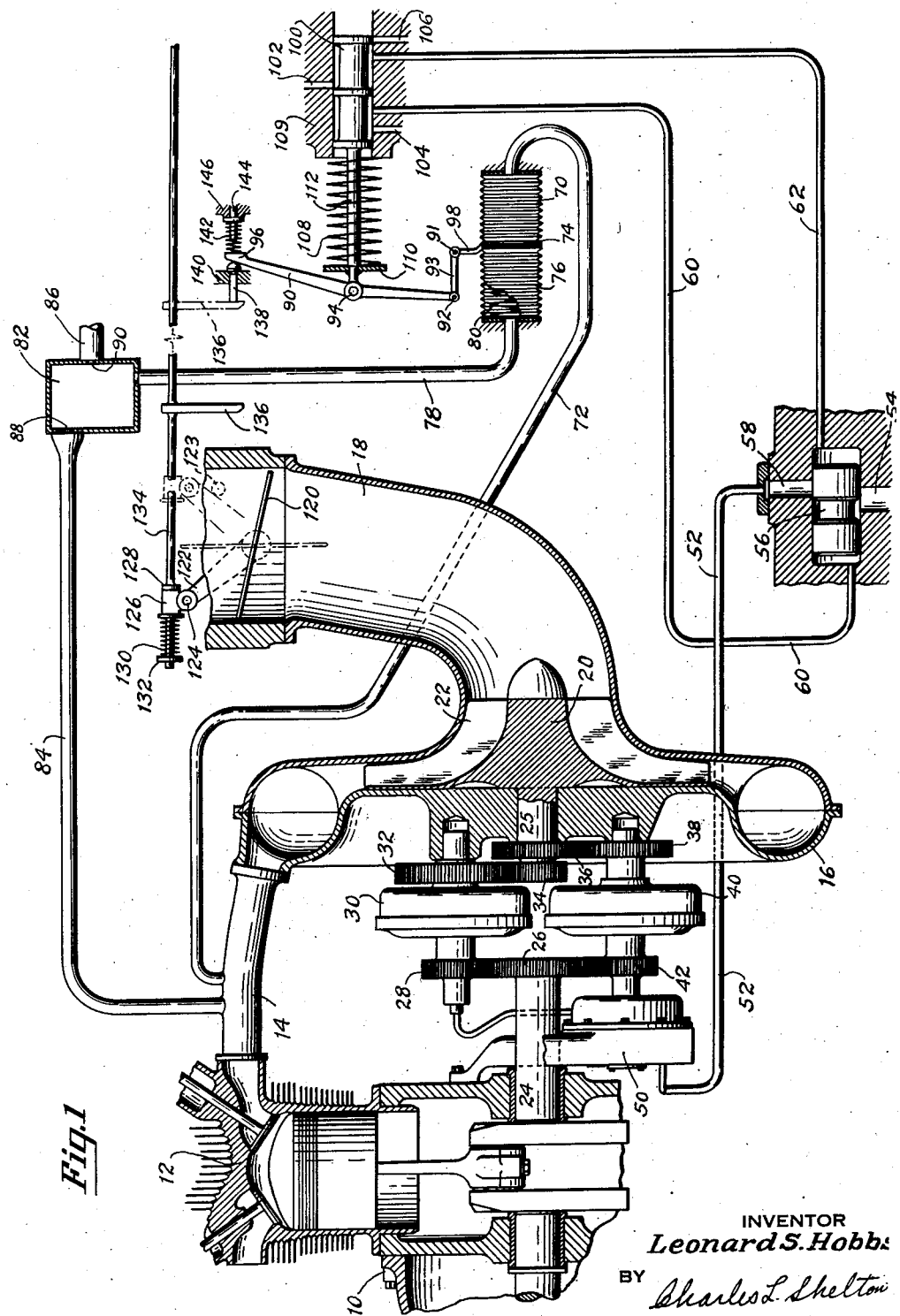

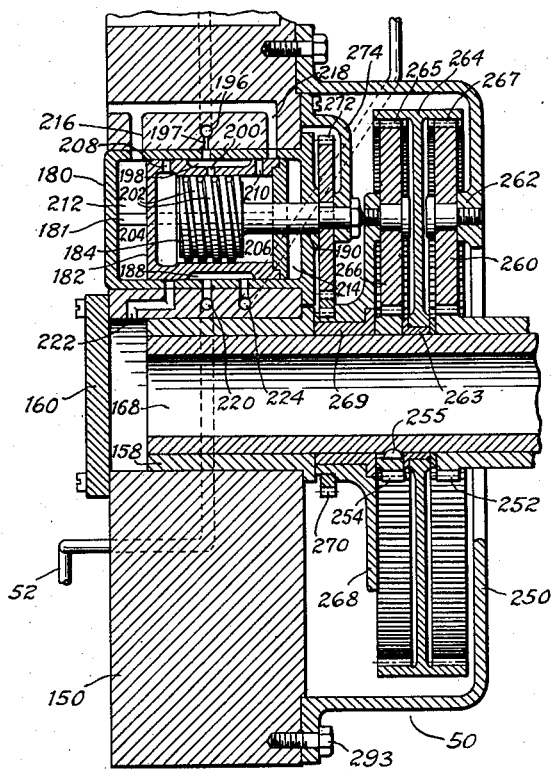

Patented May 14, 1946

2,400,306

UNITED STATES PATENT OFFICE 2,400,306

VARIABLE BLOWER DRIVE

Leonard S. Hobbs, West Hartford, Conn., assignor to United Aircraft Corporation, East Hartford, Conn., a corporation of Delaware Application June 26, 1943, Serial No. 492,422

10 Claims. (Cl. 123—119)

This invention relates to a variable speed drive particularly adapted for an internal combustion aircraft engine blower, such as a supercharger or engine cooling fan.

An object of this invention is to provide an infinitely variable speed drive in which the efficiency of the drive will be high throughout the range of speeds.

A further object of this invention is to provide an automatic gear ratio selecting means for such a high efficiency variable speed drive.

Another object is to provide a valve actuating mechanism controlled by speed differences.

Other objects and advantages will be apparent from the specification and claims, and from the accompanying drawings which illustrate what is now considered to be a preferred embodiment of the invention.

In the drawings,

Fig. 1 is a schematic view of a variable speed supercharger drive constructed according to this invention.

Fig. 2 is a view partially in section of the speed difference controlled valve mechanism of Fig. 1, showing its connection to the hydraulic couplings of the variable speed drive.

Fig. 3 is a detail view of the piston valve and actuating pump of Fig. 2.

Fig. 4 is a section along the line 4—4 of Fig. 3.

Fig. 5 is a view similar to Fig. 3 but showing a modification thereof, and

Fig. 6 is a section along the line 6—6 of Fig. 5.

Fig. 7 is an enlarged view of the valve actuating mechanism of Fig. 2.

Superchargers for aircraft engines are supplied with air of widely varying temperature and pressure. It is, therefore, desirable that the supercharger operate over a wide range of impeller speeds, for the purpose of producing the desired engine charging pressure at various altitudes and under various engine operating conditions. As the supercharger itself absorbs a considerable portion of the engine power output, it is important that the efficiency of the supercharger drive be maintained at a high value over the whole range of supercharger speeds. Similar problems are presented by aircraft engine cooling fans. Hence, a power transmission having an infinitely variable speed ratio over a fairly wide speed range and having a high efficiency at any one of various speed ratios is desirable.

According to my invention, an automatic change speed gear transmission is provided for driving a supercharger impeller and includes in each gear ratio a hydraulic coupling or hydraulic power transmission device, of the type wherein the amount of fluid present in the working circuit or chamber of the coupling determines the relative slip between the driving or impeller member and the driven or runner member thereof. Such couplings or clutches will provide a continuously variable change in the speed ratio between the driving and driven members, but operate at a relatively high efficiency only when the slip between the driving and driven members is low. By utilizing a plurality of couplings and operating each only over a range of low slip, I am able not only to obtain an infinite number of speed ratios between the engine or driving shaft and the supercharger impeller or driven shaft but, at the same time, to maintain the efficiency of the drive at a high value over the whole range of said speed ratios. While only a single supercharger stage is shown in the drawings, other blowers or stages may be provided, if desired, with my improved drive applied to any or all of such stages.

Referring to the drawings: an engine, a portion of which is shown at 10, having a cylinder 12, is supplied with intake air through manifold 14. To provide the desired boost or charging pressures for the engine at various altitudes a blower 16 is arranged for pumping air from inlet 18 to the manifold 14 by means of the impeller 20 having vanes 22. A fuel supply means (not shown) is also provided and may be of the type shown in the Buck Patent No. 2,287,021, dated June 23, 1942. Impeller 20 and shaft 25 thereof are driven by the engine crankshaft 24 through a high ratio, speed increasing gear train including crankshaft gear 26, countershaft gears 28 and 32, and impeller shaft gear 34. A high speed hydraulic coupling 30 is interposed between the countershaft gears 28, 32. This coupling is of the type is which the slip is determined by the quantity of working fluid present in the working chamber or working circuit thereof. By varying the amount of fluid present in the working circuit, the slip of the coupling may be continuously varied to infinitely change the speed of impeller 20 through a range of high speed ratios up to a maximum speed which is slightly below (by an amount determined by the minimum slip of the coupling) the speed at which the impeller would be driven if the supercharger were operated in the high gear ratio and with a positive coupling in place of the hydraulic clutch 30.

Blower impeller 20 and shaft 25 may also be driven in a low-speed ratio by crankshaft gear 26 and countershaft gears 42, 38. Countershaft gear 38 drives a low-speed blower shaft gear 36, and between the countershaft gears 38, 42 is interposed a low speed fluid coupling 40; which acts in a manner similar to that described above for the high-speed coupling to continuously vary the speed of the blower impeller through a range of low speed ratios up to a maximum determined by the low speed gear ratio less an amount determined by the minimum slip of the low speed coupling, at any given engine speed.

It might be possible to vary the speed of the blower 16 over the entire range from zero speed up to the maximum provided in the high speed drive by utilizing only high ratio gear drive and the high speed coupling and varying the slip of the high speed coupling up to 100 per cent; which would correspond to a zero blower speed. However, the efficiency of such variable slip couplings is a function of their slip and decreases as the slip increases. Therefore, if the coupling 30 were required to provide the entire speed range desired for the supercharger at any given engine speed, there would be a considerable power loss at such times when the supercharger was operated over the lower portion of the speed range because of the excessive coupling slip required. This difficulty is obviated in the embodiment of the invention shown in the drawings by utilizing the coupling 30 to drive the supercharger only over its high range of speed ratios and coupling 40 to drive the supercharger over its lower range of speed ratios. Thus each coupling may be operated independently only over a narrow range of low slip speeds and at its higher efficiencies; yet both couplings in sequence will provide the desired wide range of supercharger speeds. With such an arrangement some means is necessary to remove the non-driving coupling or couplings from the line when another coupling is driving the supercharger. If this were not done, turbulence would be created in the fluid of the non-driving coupling, which would absorb a material amount of power, wasted in the form of heat in the fluid passing through the non-driving coupling. To prevent such loss of power, the embodiment shown on the drawings includes a single speed controlled valve 50, which acts in a manner to be later explained to supply working fluid selectively and automatically to either the coupling 30 or the coupling 40, depending on the impeller speed required, but not to both couplings at the same time.

For controlling the couplings to vary the speed of the supercharger, and consequently the charging pressure in manifold 14, valve 56 is operated to vary the flow of working fluid, such as engine lubricating oil, from a source 54 of oil under pressure to conduit 52 by way of port 58. The oil admitted by valve 56 to line 52 normally passes to one or the other of couplings 30, 40, depending upon the position of valve 50. Oil is continuously passed through one or the other of the couplings, and drains therefrom through drain ports 175 (Fig. 2) which are of smaller flow capacity than the coupling inlet ports 176 and the passages leading thereto. Thus the quantity of oil present in the working circuit of the driving coupling at any one time may be varied by changing the amount of oil admitted thereto by valve 56, the drains 175 remaining continuously open.

This may be done automatically so as to regulate the pressure in manifold 14 to a predetermined value at full throttle for each aircraft altiture by the bellows 70 and 76 and control valve 100. A head 74 common to both bellows 70 and bellows 76 is subjected to the difference in the fluid pressures therein and is movable in response to changes in said pressure difference. Manifold pressure is supplied to bellows 70 through conduit 72. Bellows 76 contains a spring 80 acting against the bellows 70 and is supplied with air under pressure from a chamber 82. The pressure in chamber 82 and consequently the fluid pressure in bellows 76 is determined by the relation between the pressure in manifold 14, which is applied to the chamber through conduit 84 and orifice 88, and atmospheric pressure, which is applied to the chamber through a conduit 86 and an orifice 90. As the chamber 82 is exposed through restrictions to both manifold and atmospheric pressure, it will be evident that the pressure therein will be maintained at some intermediate or compound value which will be determined by the relative sizes of the orifices 88 and 90. By properly sizing these orifices relative to each other the bellows 76 can be subjected to a predetermined pressure which will be different at each value of the atmospheric pressure applied to the chamber through conduit 86. By this means the pressure that will be maintained in manifold 14, through the operation of the two bellows and the control valve 100 as described below, will be automatically regulated so as to vary in a predetermined relation with the altitude of the aircraft in which the apparatus is installed. This means of varying the regulation of engine charging pressure in relation to altitude is disclosed and claimed in my copending application entitled, "Control automatically variable with altitude," U. S. application Serial No. 492,421, filed June 26, 1943, concurrently herewith.

Head 74 of bellows 70 and bellows 76 is subjected to the difference in pressure between these two bellows and it will be seen that an increase in manifold pressure at a given fluid pressure in chamber 82 and bellows 76 will result in moving the head and arm 98 rigid therewith to the left as shown in the drawings, against the action of spring 80. Conversely a decrease in manifold pressure which results in a reduction in the pressure difference between the two bellows will enable spring 80 to move the head 74 and the arm 98 to the right. Arm 98 is pivotally secured at 91 to a link 93, pivoted at 92 to a lever 90 which is rotated about its fulcrum end 96 in response to movements of arm 98. Valve 100 is provided with a stem 112 pivoted at 94 to lever 90. When the engine charging pressure is at a predetermined value, this control valve is maintained in a neutral position, in which it closes the pressure oil supply port 102, by a spring 108 acting between disc 110 on the valve stem and the valve body 109, and cooperating spring 80 in bellows 76. The compression of either or both of these springs may be made adjustable.

Movement of arm 98 to the left in response to an increase in the pressure in manifold 14 will move valve 100 to open the supply port 102 to conduit 62 leading to one side of valve 56. In this position of the valve 100, drain port 106 will be closed and the other side of valve 56 will be drained through conduit 60 to the drain port 104 and the valve 56 will be forced by the oil under pressure in line 62 to the left to gradually close port 58 and decrease the supply of oil to the couplings. Consequently the quantity of oil in the working circuit of the driving coupling will decrease and the slip of the coupling will increase to lower the speed of the supercharger. As the pressure rise across the supercharger is a function of its impeller speed, this decrease in supercharger speed results in a reduction in the pressure in manifold 14, and corrects the excessive pressure condition that initially caused the control apparatus to function.

Upon a decrease in the pressure in manifold 14 below the predetermined value, spring 80 will act to move arm 98 and lever 90 to the right, which will place supply port 102 in communication with conduit 60 leading to the left side of valve 56. In this position of the valve 100 the drain port 104 will be closed and the valve 56 will be drained through conduit 62 and the drain port 106. Thus, valve 56 will be moved to the right in a direction to increase the quantity of oil in the particular coupling which is driving and as a result thereof the supercharger speed will be increased to that value which is sufficient to maintain the predetermined pressure in manifold 14. The drain ports 104, 106 may be made restricted if desired.

For throttled operation without supercharging the manually operated throttle valve 120 is provided. Arm 122 attached to the throttle 120 is pivoted at 124 to a collar 126 slidable on throttle rod 134. Collar 126 is ordinarily restrained for movement with the throttle rod by spring 130, acting between a disc 132 fixed to the throttle rod and the collar 126 to hold the collar against a stop or flange 128 on the throttle rod. However, when the throttle rod is moved to full open position, arm 122 will abut the stop 123 and in this position a further force exerted on the throttle rod 134 will act to compress spring 130 and allow a slight additional movement of rod 134, beyond its full throttle position. An abutment 136 is attached to the throttle rod in such position that it just contacts a pin 138 slidable in a fixed support 140 when the arm 122 initially contacts stop 123. The additional movement of the throttle rod beyond this position, against the action of spring 130, will cause abutment 136 to move pin 138 to the right. The other end of pin 138 bears against end 96 of lever 90 and forces it to the right against the action of spring 142 held between the fulcrum end of the lever and a fixed pin 144 in the fixed support 146.

The position of the fulcrum between the pin 138 and the lever 90 may be so selected that the valve 100 is maintained in its left-hand position, opening supply port 102 to conduit 62, by the action of spring 108, when the throttle valve is closed or partially closed and the arm 136 is free of the pin 138. Thus, the valve 56 will be held in closed position when the throttle valve is positioned to limit the flow of charging air through the intake 18. However, when the throttle valve is fully opened, and the throttle rod is moved still further to the right, then the fulcrum of lever 90 will be moved to the right to a position in which the valve 100 is rendered operative to control the position of valve 56 to regulate the charging pressure in the induction passages 14. As the rod 134 and pin 138 are moved further and further to the right, the effect is to increase the pressure required in bellows 70 to hold the valve 100 in neutral position, closing port 102. Hence, the action of the throttle rod as it moves pin 138, as permitted by the compression of spring 142, is to first render the charging pressure responsive mechanism operative and then to adjust or reset it to regulate the charging pressure to higher and higher values as the throttle rod and fulcrum 96 are moved further and further to the right.

With such an arrangement, the supercharger control apparatus is maintained inactive while the engine is being operated at part throttle and is rendered operative upon movement of the throttle rod beyond full throttle position. Additional movement of the throttle rod beyond the "control operative" position acts to reset or adjust the control to maintain higher charging pressures.

Figs. 2, 3, and 4 show in detail the construction of the speed difference controlled valve 50 and its connection with the high and low speed fluid clutches.

Valve 50 comprises a frame 150 supported on arm 152 bolted to engine 10 by bolts 154. Frame 150 provides a bearing 158 for one end of the hollow countershaft 156, the other end of which is journaled in the supercharger housing. The left-hand end of the high speed hollow countershaft 157 (underlying gear extension 162) may also be journaled in an engine supported structure, though this detail has been omitted from the schematic showing of the drawings. Driving member 172 of the low speed coupling is rotatably supported on shaft 156 and is provided with a gear 42 meshing with the driving crankshaft gear 26. It is also rotatably supported on the driven element at 258. The driven element 170 is splined or keyed at 284 to the countershaft and is also splined or keyed at 256 to the low speed countershaft gear 38 meshing with the low speed supercharger gear 36. The driving and driven elements of the high speed coupling 30 are rotatably mounted on the high speed countershaft 157 in a similar manner, except that the driven member of the high speed coupling is not splined to shaft 157, and it will be seen that the two driving elements of the couplings rotate together at speeds which are always proportional to each other, and which are equal in the embodiment shown because the gears 42 and 28 are of the same size. However, the driven elements will be rotated at different speeds relative to each other because of the fact that the high speed gears 32, 34 and the low speed gears 38, 36 are of different ratios. There, of course, will be one point or one value of slip for each coupling 30, 40 at which the respective driven elements thereof will tend to rotate the shaft 25 at exactly the same speed. The slip of coupling 30 will be sufficiently greater than the slip of coupling 40 as to just overcome the difference in the two gear ratios, and thus at these values of relative slip shaft 25 of the supercharger will be driven at the same speed by both high speed coupling 30 and low speed coupling 40.

Working fluid such as engine oil is supplied from line 52 to either one or the other of the two couplings by valve piston 182. Referring to Fig. 3, which shows the valve piston in an intermediate righthand position, the oil passes from the supply line port 220 through the piston slot 188 to port 224 and from thence (Fig. 2) through conduit 164, joint 166, and shaft 157 to the interior of the coupling 30. In this position the port 222 is closed. Inlet passages are provided in the countershaft 157 and the driven element of coupling 30 in a manner similar to that shown at 174 and 176 for the low speed coupling 40.

When the valve piston 182 is in its lefthand position, the slot 188 will place the supply port 220 in communication with port 222, from whence the oil will pass to the interior of shaft 156 and from there through ports 174 and 176 to the working chamber of the low speed coupling. In this position the port 224 is closed. A plate 160 is provided for closing the countershaft bearing bore in frame 150.

The valve per se, as is particularly shown in Fig. 3, comprises a cylinder 180 having a hollow valve piston 182 therein. The valve 182 is supplied with a viscous fluid, such as engine lubricating oil, from a source 55 through conduit 53, port 196 and a restricted opening 197. Valve piston 182 has a slot 198 which communicates with port 196 in all positions of the valve. Oil from slot 198 passes through port 200 to the interior of the piston 182.

For actuating piston 182 to selectively supply oil to either the low speed or the high speed coupling, depending upon the speed at which the supercharger is required to run to maintain the selected charging pressure in the manifold, a reversible Archimedian pump 184 is provided. This pump comprises a cylindrical member fixed on a shaft 190 journaled at 192 in the cylinder 180 and at 191 in an engine supported bracket 274. The pump member has on its external surface spiral lands 202 having a running fit with the inner cylindrical surface of the piston 182. Rotation of pump 184 in one or the other direction will act to build up oil pressure in either space 204 or space 206 at opposite sides of the pump, depending upon the direction of rotation of the pump. This difference in pressure developed across opposite sides of the pump will be a function of the rapidity of the rotation thereof and of the viscosity of the oil and will force piston 182 in one or the other direction depending upon the direction of the rotation of the pump. A key 181 (Fig. 4) is provided to restrain the valve piston against rotation relative to cylinder 180.

Drain ports 216, 218 in cylinder 180 and frame 150 are so placed relative to piston 182 as to match or coincide with the piston drain ports 208, 210, respectively, when the piston is in either its extreme lefthand or righthand position. Hence, the pressure of the viscous fluid within the valve piston 182 will be relieved after the valve piston has been fully shifted and consequently the power necessary to drive the pump when the piston is in shifted position will be reduced.

Figs. 5 and 6 are views respectively similar to Figs. 3 and 4 but show the oil supply for the pump 184 as taken by port 200 from an annular valve piston recess 189. Drains 217, 219 may be provided for draining oil from spaces 212, 214, to the sump.

Pump 184 is operatively connected with both the driving element 172 and the driven element 170 of the low speed coupling 40 through a planetary transmission 250. The driving element 172 of the coupling, which is rotatably mounted on shaft 156, is provided with pinion 252 meshing with one or more spur gears, one of which is shown at 260, mounted on a case 262 attached at 293 to frame 150. Spur gears 260 drive a ring gear 264, journaled at 263 on countershaft 156, which in turn meshes with one or more planet gears, one of which is shown at 266, mounted on a cage 268 journaled at 269 on the countershaft 156. Planet gears 266 also mesh with a sun gear 254 keyed at 255 to the countershaft 156. As the countershaft 156 is splined at 284 to the driven element of the coupling, it will be seen that sun gear 254 is torsionally fixed with respect to the driven element of the coupling, while pinion 252 is fixed to the driving element of the coupling. Cage 268 has attached thereto a pinion 270 which meshes with a spur gear 272 keyed at 271 to the pump shaft 190 for rotating the same.

The relative gear sizes are so selected as to provide a slightly greater ratio between the pinion 252 and the ring gear 264 than between the sun gear 254 and the ring gear 264. For instance, if the gears 252, 254 and the gears 260, 266, respectively, are made equal in size and number of teeth, then the internal gear 264 is provided with a slightly greater number of teeth on the side 267 that meshes with gears 260 than on the side 265 that meshes with gears 266. Thus, when the element 172 is rotating by some predetermined amount faster than element 170 the gears 252, 254 and gears 260, 266 will tend to rotate ring gear 264 at the same speed, and the cage 268 will be stationary. Preferably the planetary gearing is so designed that the cage 268 will be stationary at a predetermined value of slip for the coupling 40 in the range between about 1½% to 5% slip. At values of slip greater than this selected value, the pump 184 will be rotated in one direction and at values less than the selected value, the pump will be driven in the other direction.

Operation

Variations in the pressure in manifold 14 above or below a predetermined value, which value may be selected or adjusted by shifting pin 138 to vary the position of fulcrum 96 and which is modified upon changes in altitude by the action of chamber 82, will act to operate valve 100 to move valve 56 to decrease or increase the supply of oil admitted to conduit 52. Assuming the drive is through the high speed coupling 30 and the piston 182 is slightly to the right of the position shown in Fig. 2, a call for a lower charging pressure will result in a decrease in the oil supplied through conduit 52 and thus cause an increase in the slip of coupling 30. Ordinarily, when the drive is through the coupling 30, the low speed coupling 40 will be empty of oil and the element 170 thereof will be rotated by coupling 30 through gears 36, 38 faster than the element 172. As the slip of coupling 30 is increased, the speed of shaft 25 and likewise the speed of element 170 will be reduced until a point is reached at which the element 170 is rotating at some predetermined speed relative to element 172, slightly slower than the speed of the element 172. When the elements 170, 172 of the low speed coupling are rotating at this predetermined speed ratio, the gears 252, 254 and spur gears 260, 266 will tend to rotate the ring gear 264 at the same speed. Thus, cage 268 will not rotate and gear 272 and pump shaft 190 will also be stationary. When pump 184 is not rotating, there will be no shifting force exerted on piston 182.

As the supercharger impeller speed drops still further, driven element 170 will be rotated still slower relative to driven element 172, and the speed of element 170 will drop below the said predetermined speed relative to the speed of element 172. This will result in a movement of spur gear 266 and cage 268 about pinion 254 in a direction opposite to the direction of rotation of driving element 172. Such rotation of cage 268 and pinion 270 attached thereto causes gear 272 to rotate shaft 190 and pump 184 in a direction to increase the pressure in space 204 and decrease the pressure in space 206. This will force valve piston 182 to the left and as the piston shifts, it will gradually place supply port 220 in communication with port 222 by way of piston slot 188 and at the same time gradually cut off the supply of oil to high speed port 224. In the extreme lefthand position of the piston, the oil supply from line 52, as regulated by the action of valve 56, will be supplied only to the low speed coupling 40. Thus, when the driven element of the low speed coupling is rotating at a speed which is less than the speed of the driving element minus an amount approximately equal to a predetermined value of minimum slip for the low speed coupling, the oil supply to the high speed coupling 30 will be cutoff and all the oil will be delivered to the low speed coupling 40 by the action of valve 50.

Conversely, as the slip of the low speed coupling is decreased by the admission of more and more oil thereto through conduit 52 and ports 220, 222, the speed of the driven element 170 will more and more closely approach the speed of the driving element 172 thereof. When these speeds reach a predetermined ratio, or when the slip of the coupling is at a predetermined value, then pump 184 will stop rotating. As the slip of the low speed coupling decreases still further, the pump will begin to rotate in the opposite direction. When the pump stops and then begins to rotate in the opposite direction, the valve piston 182 will be moved to gradually uncover the high speed port 224 while at the same time gradually closing low speed port 222. The high speed coupling will take over the load as the valve piston is shifted. As the supply of oil to the low speed coupling is cut-off, this coupling will drain through the drain ports 175, the centrifugal pressure on the oil caused by rotation of the coupling members aiding such draining action. As previously stated, these drain ports 175 are always open but have a flow capacity smaller than the flow capacity of the inlet passages. Hence, the quantity of working fluid retained in the coupling may be altered by simply varying the amount of oil supplied thereto, in relation to the capacity of the drain ports 175, and either coupling may be drained merely by cutting off the oil supply thereto. After leaving drain ports 175, the oil may be returned to a sump (not shown) from which it is forced by a pump to valve 56, thus forming a continuous hydraulic circuit. Similarly, oil from drains 216, 218 may be returned to chamber 55.

When the driven element 170 of the low speed coupling is rotating considerably slower than the driving element 172, the pump 184 will be rotated in a direction to hold piston 182 in the left position in which it opens the supply port 220 to the low speed port 222. As this difference in speed between the driven and driving elements of the low speed coupling becomes less, the speed of pump 184 will become less until, as it passes a speed corresponding approximately to a selected value of slip of the low speed coupling, it reverses its direction of rotation and forces the piston 182 to assume its righthand position in which oil is admitted to the high speed port 224. The drive will then shift to the high speed coupling 30 and the low speed coupling will empty and "float" on the line. However, if the slip of the high speed coupling becomes excessive, with resultant high power loss, then the driven element of the low speed coupling will again pass the predetermined speed relative to the speed of the driving element and pump 184 will be rotated in a direction to move valve piston 182 leftward to gradually admit oil to the low speed coupling and at the same time to gradually cut off the supply of oil to the high speed coupling, which will then empty of oil through the drain holes.

Thus, the drive will always be through the low speed gear ratio and coupling where they are capable of producing the required supercharger impeller speed to maintain the predetermined pressure in the manifold, and will be automatically shifted over to the high speed gear ratio and coupling when it is necessary to rotate the supercharger impeller at speeds over and above those which could be produced by the low ratio gear train. Conversely, the drive will be automatically shifted from the high speed ratio to the low speed ratio where the low speed coupling can produce the required impeller speed and thus will obviate large power losses which would otherwise result by a drive through a high speed gear ratio but with an excessive large slip in the fluid coupling. The drive may be designed as schematically shown in the drawings to cut-out the coupling or couplings of one ratio as the coupling or couplings of another ratio are cut-in, and thus at no time need both couplings be fully engaged.

In starting, the engine piston valve 182 will ordinarily be in its lefthand position in which it admits oil to the low speed coupling. But even if this were not the case, it will be seen that the valve 182 will be immediately shifted to the left, when the engine is started, to open communication between the supply conduit 52 and the low speed coupling; and the drive will usually be initially assumed, as it should be, by the low speed coupling.

It is to be understood that the invention is not limited to the specific embodiment herein illustrated and described, but may be used in other ways without departure from its spirit as defined by the following claims.

I claim:

1. In combination, an aircraft engine, a blower therefor, a multiple speed ratio transmission operatively connecting said blower with said engine, means for selectively driving said blower by said engine in any one of said transmission ratios, variable efficiency hydraulic means for varying the relative speeds of said blower and said engine while connected in each of said transmission ratios, and means automatically operative to select and render effective that transmission ratio producing the higher blower drive efficiency over the lower portion of the speed difference range between said blower and said engine.

2. In combination, an aircraft engine, a charging blower therefor, a driven gear connected with said blower, a driving gear connected with said engine, a higher speed ratio gear train drivingly connecting said driving gear and said driven gear, a lower speed ratio gear train drivingly connecting said driving gear and said driven gear, a first fluid coupling in said higher ratio gear train, a second fluid coupling in said lower ratio gear train, said second fluid coupling including a driving member and a driven member, a valve connected with the driving and driven members of said second coupling, conduits connecting both said couplings with said valve, a supply conduit connecting said valve with a source of working fluid under pressure, means actuated in response to a change in the relative speed of the driving and driven members of said second coupling for shifting said valve to respective positions connecting said supply conduit with either said first coupling or said second coupling through said connecting conduits, adjustable flow controlling means in said supply conduit for regulating the supply of working fluid to said couplings through said valve, and means responsive to a change in the charging pressure of said engine for adjusting said flow controlling means to regulate said engine charging pressure.

3. In a variable speed ratio power transmission, a driven shaft, a driving shaft, a higher ratio speed increasing gear train including a variable slip fluid coupling interconnecting said driving and driven shafts, a lower ratio speed increasing gear train including a variable slip fluid coupling interconnecting said driving and driven shafts, means for supplying a working fluid to said couplings, and means responsive to a change in the relative speed of the driving and driven members of one of said couplings operative to shift the supply of working fluid from one to another of said couplings.

4. A variable speed ratio power transmission comprising: a driven shaft, a driving shaft, a higher speed gear train including a variable slip fluid coupling drivingly connecting said driving and driven shafts, a lower speed gear train including a variable slip fluid coupling drivingly connecting said driving and driven shafts, fluid supply means including a flow controlling device for varying the slip of either of said couplings from a maximum to a minimum, means including means responsive to variations in the relative speed of the driving and driven members of one of said couplings effective at a condition of approximately minimum slip of the lower speed coupling to connect said fluid supply means with said higher speed coupling and effective at an intermediate value of slip of the higher speed coupling to connect said fluid supply means with said lower speed coupling.

5. In a variable speed ratio power transmission, at least two fluid couplings each having driving and driven members, gears interconnecting said driving coupling members, gears interconnecting said driven coupling members, means including a valve for controlling the admission of working fluid to said couplings, and valve actuating means operatively connected with the driving and driven members of one coupling and operative in response to changes in the relative speed of said driving and driven members to move said valve to respective positions in which one or another of said couplings is independently rendered operative.

6. A valve construction comprising a cylinder, a hollow valve piston movable in said cylinder, a viscous fluid in said piston, at least one fluid port in said cylinder positioned to be opened and closed by movement of said piston, a reversible rotatable pump in said piston effective upon rotation thereof in one direction to create a pressure difference in said fluid across said pump to move said piston in one direction relative to said port and upon rotation thereof in a reverse direction to reverse said pressure difference to move said piston in another direction relative to said port, and means effective in a predetermined piston position and ineffective in other piston positions to reduce the fluid pressure difference created by said pump.

7. In combination, an aircraft engine, a blower, fluid drive means including a first fluid coupling for driving said blower by said engine, within a first predetermined range of speed ratios, fluid drive means including a second fluid coupling for driving said blower by said engine within a second predetermined range of speed ratios, means including means responsive to variations in the relative speed of the driving and driven members of one of said couplings for selectively engaging said couplings in accordance with variations in said relative speed, and means for varying the slip of the engaged coupling to continuously vary the speed of said blower relative to said engine throughout said first and second ranges of speed ratios.

8. In combination with an aircraft engine, a blower, a higher speed ratio gear train for driving said blower by said engine, a lower speed ratio gear train for driving said blower by said engine, a fluid coupling in each of said gear trains, means including an automatically operative valve for selectively engaging one or another of said couplings to drive said blower through said higher ratio gear train or said lower ratio gear train in accordance with variations in the speed of said blower relative to said engine, and means including a second valve for controlling the speed of said blower relative to said engine by regulating the slip of an engaged coupling.

9. The combination of claim 8, including means responsive to variations in a fluid pressure produced by said blower for actuating said second valve.

10. In combination with an aircraft engine, a blower, a higher speed ratio gear train for driving said blower by said engine, a lower speed ratio gear train for driving said blower by said engine, a fluid coupling including a driving member and a driven member in each of said gear trains, means for admitting a working fluid to said couplings, and means including a device responsive to a predetermined change in the relative speed of the driven and driving members of one of said couplings for engaging and disengaging said couplings to selectively drive said blower through said higher ratio gear train or said lower ratio gear train in accordance with variations in the speed of said blower relative to said engine.

LEONARD S. HOBBS.